United States Patent [19]

Nakazawa

[11] Patent Number: 5,528,022
[45] Date of Patent: Jun. 18, 1996

[54] SYMBOL READ DEVICE

[75] Inventor: Atsushi Nakazawa, Osaka, Japan

[73] Assignee: Sumitomo Electric Industries, Ltd., Osaka, Japan

[21] Appl. No.: 130,429

[22] Filed: Oct. 1, 1993

Related U.S. Application Data

[63] Continuation of Ser. No. 710,182, Jun. 6, 1991, abandoned.

[30] Foreign Application Priority Data

| Jun. 6, 1990 | [JP] | Japan | 2-147687 |
| Jul. 2, 1990 | [JP] | Japan | 2-175565 |
| Nov. 15, 1990 | [JP] | Japan | 2-310933 |

[51] Int. Cl.⁶ ................................................. G06K 7/00
[52] U.S. Cl. ...................... 235/436; 235/455; 235/462; 250/205
[58] Field of Search ..................... 235/436, 454, 235/455, 462, 467, 465; 250/205, 557, 555, 208.2, 566, 578.1, 494.1

[56] References Cited

U.S. PATENT DOCUMENTS

| 3,714,397 | 1/1973 | Macey et al. | 235/465 X |
| 3,812,325 | 5/1974 | Schmidt | 235/465 X |
| 4,020,357 | 4/1977 | Punis | 235/455 X |
| 4,342,050 | 7/1982 | Traino | 235/455 X |
| 4,673,805 | 6/1987 | Shepard et al. | 235/455 X |
| 4,818,847 | 4/1989 | Hara et al. | 235/455 |
| 4,882,476 | 11/1989 | White | 235/462 |
| 5,095,203 | 3/1992 | Sato et al. | 250/222.1 |
| 5,260,553 | 11/1993 | Rockstein et al. | 235/462 |

FOREIGN PATENT DOCUMENTS

| 0176933 | 4/1986 | European Pat. Off. . | |
| 0180331 | 5/1986 | European Pat. Off. . | |
| 0194115 | 9/1986 | European Pat. Off. . | |
| 0342772 | 11/1989 | European Pat. Off. | 250/555 |
| 54-99523 | 8/1979 | Japan | 250/205 |
| 01-25287 | 1/1989 | Japan . | |
| 2-159687 | 6/1990 | Japan | 250/205 |

*Primary Examiner*—Donald T. Hajec
*Assistant Examiner*—Jeffrey R. Filipek
*Attorney, Agent, or Firm*—Cushman, Darby & Cushman

[57] ABSTRACT

A symbol read device useful as a bar code reader, optical character reader or the like. A symbol bearing surface is illuminated by two different light sources that are distinguishable based on their respective wavelengths or modulated frequencies. A detector detects light reflected from the symbol surface and provides a detection signal indicative thereof. The detection signal is processed to recognize the symbol being read. In a multi-scan embodiment, an automatic gain control (AGC) circuit controls a level of detector signal to aid in recognition of the symbols being read.

21 Claims, 9 Drawing Sheets

SYMBOL READ DEVICE

This is a continuation of application Ser. No. 07/710,182, filed on Jun. 6, 1991, which was abandoned upon the filing hereof.

BACKGROUND OF THE INVENTION

1. Field of the Invention

The present invention relates to a symbol read device for optically reading symbols, such as bar codes and characters, by scanning the symbols with a light beam. More particularly the invention is directed to a symbol read device which is capable of reading symbols, regardless of their orientations, by scanning the symbols in different directions.

2. Description of the Related Art

With the widespread use of computers, there has been increasing demand for various types of automated input/output devices. One such device is an optical character reader (OCR) and another is a bar code reader (BCR). Such devices can read characters and codes recorded on cards, packages, and the like. It is required to accurately read characters and codes on character and code bearing surfaces by a read head relatively distant from the surface being read and not in contact with the character and the code bearing surfaces.

A known symbol read device includes a stand-alone type casing containing a laser beam generator for generating a laser beam, a scanning mirror for scanning the laser beam over a predetermined angular range (the scanning mirror could be a polygon mirror or a galvano mirror), a photodetecting element for receiving a light beam reflected from a symbol surface bearing a symbol thereon, and a signal processor for processing an output signal of the photodetecting element so as to recognize the symbol being read.

A known bar code reader employs a laser beam for scanning a surface bearing the bar code. The laser beam forms a small spot even at a distant position from the surface being read. Thus, it is capable of reading bar codes near to or far from the reader (large read depth). The bar code reader can automatically scan bar codes with the laser beam. An operator places an object bearing a bar code within a read field of a laser emitting window and the reader reads the bar code. When using a bar code reader in a pen-type casing, he places and slides a pen point of the device over the symbol surface bearing the code to be read.

In various applications, it is advantageous to use a so called hand-held type bar code reader. The various elements of such a reader are contained in a pistol-like casing for easy use. It can read the bar code by merely pointing the device at a target. It is handy and portable. Further, it can read from a surface of an object with which it is not even in direct contact. For example, a hand-held reader can be used to read a small bar code printed on a printed circuit board.

In a laser scan type symbol read device, laser light repeatedly scans a surface on which there is a symbol to be read. Laser light, having impinged on the symbol laden surface is reflected. The reflected light carries information as to the symbol on the surface. This light is converted into an electrical signal by some sort of photodetector. The output of the photodetector is amplified by an amplifier and signal processed by some kind of recognizing circuit. The recognizing circuit may, for example, convert the amplified signal into a two-value signal and recognize based on some threshold level.

The symbol surfaces may be located at various distances from the reading device, such as, for example, several cm to 1 m. Thus, the intensities of the reflected light received at the photodetector may vary significantly. If the gain of the amplifier is set to a level required for a close symbol surface, the device cannot read a symbol on a surface that is a great distance from the device. If the amplifier gain is set so as to read distant symbol surfaces, the device will not be able to read nearby symbols because the amplifier will be saturated.

For this reason, a symbol read device designed to have a wide read range employs an automatic gain control technique which automatically accommodates the magnitude output of the photodetecting element on the basis of the amount of the reflected light from the previous scan. Levels of signals input to the recognizing circuit are limited to be within a preset range by selecting a small gain for a large quantity of reflected light from a close symbol surface, and a large gain for a small quantity of reflected light from a distant symbol surface. Thus, such a symbol read device can provide symbol recognition regardless of read distance.

Recently, symbol read devices have been developed that employ an omni scan process or a raster scan process to make it easier for an operator to scan symbols. In the omni scan process, as shown in FIG. 13, a symbol is scanned by a plurality of scan lines at different angles. In the raster scan process, as shown in FIG. 14, symbols are scanned by a plurality of parallel scan lines s1 to s5.

The bar code read device of the omni scan type can read the symbol if any one of the scan lines scans across the entire bar code. Accordingly, there is no need to place the scanning device in a particular positional relationship with the bar code being read. The handling of the bar code read device when it reads symbols is remarkably improved.

A raster scan bar code device can read symbols if the scan lines are slightly oblique with respect to the bar code, because any of the scan lines will move across the entire bar code. In this respect, the device is easy to handle for reading a bar code. The device can even read a bar code with a cut-out if any of the scan lines traverses a perfect bar code portion of a defective bar code.

Bar code read devices including a laser beam are generally arranged so as to constantly emit a laser beam. The emitted laser beam may directly hit the operator's eyes. Such devices are usually designed to read a relatively distant bar code. However, when a bar code, which is not the one intended to be read, unexpectedly comes in a read range of the device, it will mistakenly be read. In this respect, it is desirable that the device emits the laser beam only when reading bar codes.

To cope with the problem, a conventional bar code read device includes a read start switch. The laser beam is emitted only when the switch is operated. Of course, the switch must be operated every time the bar code is read. This is very inconvenient particularly in such a situation as to read a number of bar codes, because the switch must be operated many times. Accordingly, repetitive operations impede efficiently entering data.

To solve the problem, there is a technique disclosed in Japanese Patent Application Unexamined Publication No. 64-25287. The publication discloses a laser oscillator for generating the laser beam that is intermittently operated even when a bar code is not being read. The oscillator is continuously operated when an output signal of a photodetecting element is within a preset range of its value during the oscillation of the laser oscillator. When a quantity of the light reflected from the symbol surface is within a predetermined range of its values, the device judges that the symbol surface is present at a bar code read possible position, and automatically starts the operation of reading the bar codes. This technique is efficient.

However, there are problems associated with this technique. First, there is a danger that the laser beam may hit the eyes of the operator or persons present near the bar code read device, because the laser beam is intermittently emitted even when a bar code is not being read. Secondly, an additional controller is required. That is, to detect the symbol surface, the laser beam is directed toward the center of the scanning angular range and fixed thereat. The controller is additionally required to effect the control of the laser beam, which makes the construction of the device somewhat complicated.

The bar code reader of the multi-directional scan type is advantageous in that the positional relationship between the bar code and the bar code reader is not always accurately set. This can effect efficient reading of bar codes. Also, when this type of bar code reader reads a plurality of bar codes closely arranged side by side, it may mistakenly read a bar code that is not intended to be read. A read error occurs when the laser beam obliquely scans a bar code, but fails to entirely scan the bar code. In the multi-directional scan type bar code reader, a read error will more frequently occur than in the unidirectional scan type bar code reader, because in the former, the positional relationship between the bar code and the bar code reader is roughly set. The problem is serious particularly when the data after read is not checked, and use of the unidirectional scan for reading bar codes sometimes ensures a reliable data read. Here, the check is a process of judging as to whether the bar code read is correct or not by detecting the first and last characters of a bar code when these characters are preset or the number of digits of a bar code when it consists of a predetermined number of digits.

As described above, multi-directional scan bar code readers are advantageous in some respects and are disadvantageous in others.

In omni scan and raster scan type bar code readers, the symbol surface is scanned in successive order, so that the scanned position on the surface is different every scan. The quantity of the light reflected from the symbol surface may be different from scan to scan. The change in reflected light may be remarkably large particularly when the photodetecting element receives the light from the symbol surface positioned directly opposite to the photodetecting element or when an object of high reflectivity, for example, metal is present on the scan path.

The automatic gain control technique which determines the gain of a variable gain amplifier on the basis of a previous scan, fails to deal with such a situation. When the amount of received light is extremely increased, the gain for the output of the photodetecting element in the present scan is controlled to be extremely small because of the extremely high quantity of the reflected light in the previous scan. Under this condition, if the symbol is correctly scanned, the read device cannot recognize the symbol since the gain for the output of the photodetecting element is considerably small. Thus, when using the bar code read devices of the omni scan type and the raster scan type, there is a case where use of the automatic gain control technique will degrade read performance. One way to avoid this is to narrow a range of read distance (read range), and to not use the automatic gain control technique. However, this makes it difficult to handle and operate the bar code read device.

SUMMARY OF THE INVENTION

Accordingly, the present invention provides a symbol read device intended to overcome the various technical problems described above. "Symbol read device" is intended to include bar code readers, optical character readers and other such devices. Various embodiments of a symbol read device can be operated selectively in various reading modes to cope with a variety of reading situations.

A first embodiment (FIG. 1) utilizes separate light sources to generate a reading beam and positional light. These light sources are either modulated with different frequencies or are of different wavelengths. Separate detectors are provided, in conjunction with filters for distinguishing electrical signals resulting from the detection of each of the two light sources.

A beam emitter emits a laser beam. A scanner is provided for scanning a symbol surface bearing a symbol formed thereon with the laser beam. A first detector is provided for receiving a light beam reflected by the symbol surface and converting the detected light beam into an electrical signal. A recognizing circuit recognizes information represented by the symbol on the basis of the output signal of the first detector during the scanning operation of the symbol surface with the laser beam.

The light beam emitted from the light source is detected by the second detector. When the distance between the symbol surface and the symbol read device is long, the amount of light reflected from the symbol surface is small and the output of the second detector is also small. When the symbol surface is out of a read field of the read device, reflected light is not detected by the second detector.

When the output signal of the second detector is above a predetermined level, the controller drives the beam emitter and the scanner which in turn starts the symbol read operation. Accordingly, when the symbol surface is relatively distant from the read device or it is out of the read field of the read device, the read operation is not performed. However, when the symbol surface is located at such a position to ensure a reliable symbol read, the second detector detects a satisfactory amount of reflected light. The controller drives the beam emitter and the scanner and then starts the symbol read operation. Thus, the controller judges whether or not the symbol surface is located at the reliable symbol read position, according to the output signal of the second detector, and if it is at that position, allows the symbol read device to read symbols.

The light source may be any light source that can be used to determine the position of the symbol surface. A high power light source, such as a laser source, is not necessary. It is preferable to use a lower power light source that can safely hit an operator's eyes.

The symbol reading laser beam is modulated by a first frequency, and the light beam emitted from the light source is modulated by a second frequency different from the first frequency. By modulating at different frequencies, the signal corresponding to the laser beam can be separated from the signal corresponding to the light beam from the light source. Accordingly, the recognizing circuit can recognize symbols while not responding to the adverse effect by the light other than from the reading laser beam. The controller can make a reliable judgement on the symbol surface position, and is free from the adverse effect by the laser beam.

In an alternative embodiment, different light wave lengths are used. The reading laser beam has a first wave length and the light used to determine symbol surface position has a second wave length. Detection circuits provide a first detection signal based on light of the first wave length and a second detection signal based on light of the second wave length. The first and second detection signals discriminate light from the two light sources without any confusion. Therefore, the symbol read device can reliably recognize symbols by the recognizing circuit and can make a reliable judgement on the position of the symbol surface by the controller. This technique can utilize either a single detector or two separate and distinct detectors. If a single detector is used, the output signal of the detector is separated into components by a signal separator. Those components are respectively applied to the recognizing circuit and the controller.

If different modulating frequencies are used, the laser beam emitted from the beam emitter is modulated by a first frequency, and light from the positional light source is modulated by a second frequency different from the first frequency. The signal separator includes filters for separating the two modulating frequencies and applying the resulting signals to the recognizing circuit and controller, respectively. A single detector can be used.

In another embodiment (FIG. 2) a single detector is used. An output signal generated by the detector is separately filtered by two distinct filters to separate signal components resulting from each of the two light sources.

In another embodiment (FIG. 3), the output signal of a single detector is selectively coupled to either a recognizing circuit for interpreting the symbol being read, or to a controller for controlling the light sources. A controller selectively drives the beam emitter or the positional light source, and the signal separator includes a selector operating such that when the beam emitter is driven, the selector applies the output signal of the detector to the recognizing circuit, and when the light source is driven, the selector applies the output signal of the detector to the controller. The detector is selectively used for the symbol recognition or the symbol surface position judgement. There is no confusion of the laser beam with the light beam from the light source.

In another embodiment (FIG. 4), the symbol read device can operate in an omni-scan or in a raster-scan mode. Operating in one of these modes, multiple scan lines are produced so that the operator does not have to accurately position the symbol read device with respect to the symbol surface being read. A scan direction detector is provided to determine which line is being scanned so that the recognizing circuitry can be controlled appropriately. In both the omni-scan mode and the raster-scan mode, the symbol surface is multiply scanned. In other words, the surface is repeatedly scanned with scan lines that are positioned differently from one another. The use of multiple scan lines allows an operator to not have to worry about positioning the reading laser beam accurately with respect to the symbol being read. Thus, it provides an efficient method for data entry, while ensuring safety in handling the symbol read device.

Omni or raster-scan configurations may include automatic gain control circuitry (FIG. 6 embodiment) which adjusts the gain of a variable gain amplifier in order to distinguish particular scan lines. Two different embodiments of automatic gain control circuitry are detailed (FIGS. 10, 12).

In multiple scan configurations, the symbol read device has a beam emitter for emitting a light beam, a scanner for scanning a symbol surface bearing a symbol thereon with the light beam from the beam emitter in different scan directions, and a detector for detecting the light reflected from the symbol surface, the symbol read device reading the symbol by the scan of any of the scan directions. The device can operate in a mode in which only the scan of one or more specific scan directions uses a high power beam or in a mode in which the scans of all of the scan directions are performed with a light beam of an equal power. In the scan mode in which a large power laser beam is used only in the specific scan direction, when it is selected, the beam emitter reduces its output power, based on a signal from the filter, during the periods of the scanning operations in other scan directions than the specific scan mode. During the period of the reduced output power, the detector receives a quantity of light insufficient to recognize the symbol. Accordingly, during this period, no symbol read is performed. Thus, an operator may select, by the selector, one of the read modes, the read mode to read symbols by the scanning of all of the directions and the read mode to read symbols by the scanning of a specific scan direction, according to the device use conditions.

When a distance between the symbol surface and the symbol read device is sufficiently short, the second value is set at such a value as to allow the device to read symbols. With the value so set, when the read distance is short, the all-of-scan-direction read mode may be performed. When the read distance is long, the specific-scan-direction read mode may be performed.

In another embodiment, the symbol read device has a beam emitter for emitting a light beam, a scanner for scanning a symbol surface bearing a symbol thereon with the light beam from the beam emitter in different scan directions, and a detector for detecting the light reflected from the symbol surface, the symbol read device reading the symbol by the scan of any of the scan directions. The scan in other scan directions than the specific scan direction in which the beam emitter is turned on by the pulse signal of the second frequency, is substantially neglected. As a consequence, an operator may select, by the selector, one of the read modes, the read mode to read symbols by the scanning of all of the directions and the read mode to read symbols by the scanning of a specific scan direction, according to the device use conditions. A selector selects the specific scan direction or the plurality of scan directions. The specific scan direction can be selected so that the device can be flexibly used in a manner that the limited scan directions are properly selected according to states of installing the symbol read device and orientations of the symbols formed, and operator's tastes.

In a multiple scan arrangement, the symbol read device has a beam emitter for emitting a light beam, a scanner for scanning different positions on a symbol surface bearing a symbol thereon with a light beam emitted from the beam emitter in successive order, detector for receiving light reflected from the symbol surface, a variable gain amplifier for amplifying an output signal of the detector, and a recognizing circuit for performing a signal processing for recognizing the symbol, using a signal from the variable gain amplifier. The gain of the variable gain amplifier for the output signal of the detector caused by each scan line or scan line group is set independent of the gains set for other scan lines or scan line groups. A gain for a scan line or a scan line group, for example, is set according to the output signal of the detector in the previous scan by the scanner to form the scan line or scan line group, so that it is not influenced by the output signal of the detector by other scan lines or scan line groups.

When the detector receives the regular reflection light from the symbol surface during a scan or when a scan line group moves across an object of a high reflectivity, such as metal, and light of high intensity is incident on the detector, if the gain for the scan line or the scan line group becomes extremely small, such an extremely small gain will not be set for another scan line or scan line group. Therefore, the symbol read device can accurately read symbols using the output signal of the detector for the latter scan line or scan line group. A selector selectively places the automatic gain controller in a state that of the gains set every scan line or scan line group, only a gain for the output signal of the detector caused by a specific scan line or scan line group is set to a value corresponding to the output signal of the detector, while gains for the remaining scan lines or scan line groups are set to a fixed value or in a state that gains set for all of the scan lines or the scan line groups to a value corresponding to the output signal of the detector.

If the fixed value is satisfactorily small, the symbol read device may perform the symbol recognizing processing using only the output signal of the detector by the single scan line or scan line group, while prohibiting the symbol recognition processing using the output signal of the detector by the other scan lines or scan line groups. This feature is very useful for a case where many symbols are closely arrayed and an undesired symbol may be mistakenly read. In this case, the mistaken read can be avoided by specifying a scan line or a scan line group to be used for symbol recognition.

The fixed value may be set to a gain selected when a symbol is located within a short distance apart from the device.

A distant symbol is recognized according to only the output signal of the detector caused by a scan line or a scan line group, realizing an accurate symbol read. A near symbol is recognized according to the output signals of the detector by all of the scan lines, providing an excellent handling of the symbol read device when reading symbols.

BRIEF DESCRIPTION OF THE DRAWINGS

Various embodiments of the invention will be described in detail with reference to the figures. Like reference numerals designate like or corresponding parts.

DETAILED DESCRIPTION OF THE PREFERRED EMBODIMENTS

The following described embodiments constitute the best mode at the time this application was filed for practicing the invention.

Figure 1:
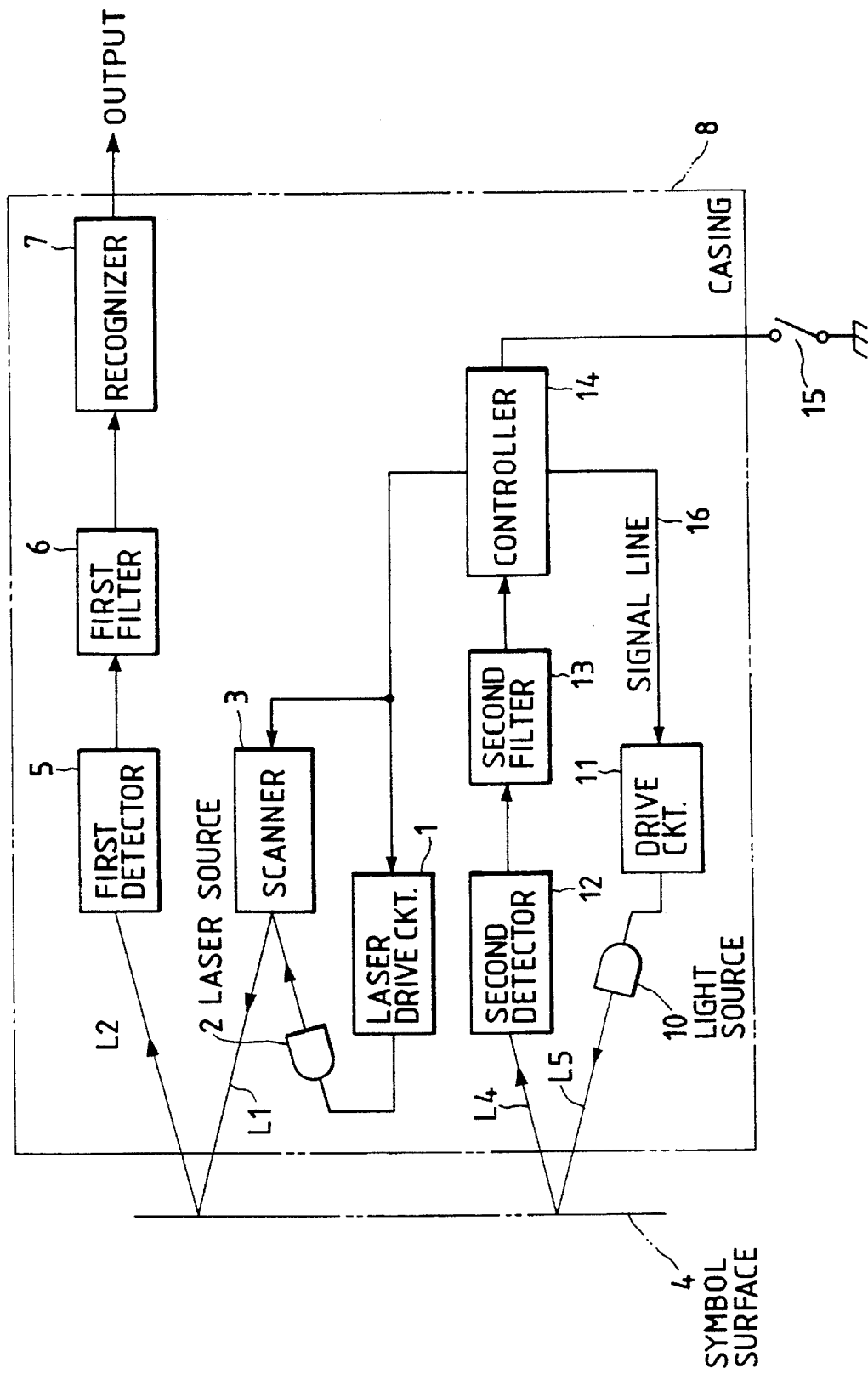
FIG. 1 is a block diagram of a first embodiment of a symbol read device according to the present invention.

FIG. 1 is a block diagram of a first embodiment of a symbol read device according to the present invention. A laser drive circuit 1 pulse-drives a laser source 2 which constitutes a beam emitting means which emits a laser beam L1. This beam may be referred to as the reading beam because light from this beam is ultimately detected and interpreted to read a symbol. A scanner 3 causes the laser beam to scan a symbol surface 4 bearing a bar code (not shown). Scanner 3 may include scanning mirrors, such as a polygon mirror and a galvano mirror, and a motor for driving the mirrors. The laser drive circuit 1 drives the laser source 2 at a first predetermined frequency f1, e.g., 1 MHz., higher than a spatial frequency of the bar code. Accordingly, the laser beam L1 is a light beam modulated by the first frequency f1.

Light L2 is light L1, as reflected from surface 4 and may carry information as to the symbols on surface 4. Light L2 is received by a detecting circuit 5. Detecting circuit 5 outputs a first electrical signal corresponding to light L2. The first electrical signal is filtered by a filter circuit 6, which provides a filtered output to a recognizing circuit 7. Recognizing circuit 7 waveshapes the signal from filter 6 to generate signals corresponding to white bars and black bars of a bar code, discriminates the generated signals at proper slice levels to convert the signals into two-value signals, and reproduces information represented by the bar code on the basis of the two-value signal. The output signal of the recognizing circuit 7 provides input to some data receiving device, such as, for example, a personal computer (not shown). Reference numeral 8 designates a casing containing the components as mentioned above.

A second light source 10 (different from laser 2), is provided within the casing 8. Light source 10 may or may not be a laser beam. It could, for example, be a light emitting diode, or the like. Light source 10 is driven by a drive circuit 11, that is, pulse-driven at a predetermined second frequency f2 different from the first frequency, e.g., 2 MHz. or less. Second frequency f2 is different from first frequency f1 and is much higher than the spatial frequency of the bar code. A light L3 from light source 10 illuminates symbol surface 4. Light reflected from symbol surface 4 is received by a second detector circuit 12 where it is converted into a second electrical signal. The second electrical signal is filtered by a filter 13. Filter 13 has a pass band with a center frequency of f2. Thus, the light L3, modulated by frequency f2 is passed. Most of the adverse effects caused by disturbance lights, for example, light from a fluorescent lamp, are eliminated. Further, since the laser beam L1 and the light beam L3 have been modulated with different frequencies f1 and f2, the reflected light beams corresponding to them will not be mistakenly recognized.

The output of filter 13 is coupled to an input of a control circuit 14. The control circuit 14 controls laser drive circuit 1, the scanner 3, and the drive circuit 11. A switch 15 is provided which is accessible from the outside of the casing 8. The switch 15 is operated by an operator to start the reading operation of bar codes. When the switch 15 is operated, and an output signal of the second detector circuit 12, which the control circuit 14 receives through filter 13, is in excess of a predetermined level, the control circuit 14 applies a control signal for driving the laser source 2 to the laser drive circuit 1, and applies a control signal for power-energizing the motor, which drives the scanning mirror of scanner 3.

The drive circuit 11 pulse-drives the light source 10 constantly, for example. Accordingly, when the laser source 2 is driven, the first and second detector circuits 5 and 12 detect reflected light L2 and L4, respectively. Because the pass bands of filters 6 and 13 are appropriately set, each filter picks up signal components attributable to its associated light source L1 and L3, respectively. This arrangement tends to prevent erroneous operation of the control circuit 14 and the recognizing circuit 7.

When the symbol surface 4 is located so far from the casing 8 that it is likely that there would be an error in reading the bar code, the quantity of the reflected light L4 received by the second detector circuit 12 is small. When the symbol surface 4 is out of the read range of the bar code read device, the light beam 13 of the light source 10 is not reflected by the symbol surface 4, and hence the second detector 12 cannot detect the light beam modulated by the second frequency f2. Thus, when the symbol surface 4 is distant or is out of the read range of the bar code read device, the electrical signal from filter 13 to the controller 4 will not exceed a predetermined level. In this case, the laser source 2 does not emit the laser beam L1, and the scanner 3 is not driven.

When the symbol surface 4 is within the read range, and is sufficiently close to the casing 8 to allow the bar code read device to read the bar code, the quantity of the reflected light 14 from the symbol surface 4 is large enough so that the output from filter 13 exceeds the predetermined level, and the controller 14 generates control signals to operate the laser drive circuit 1 and the scanner 3.

Laser beam L1 is not emitted when the symbol surface 4 is located so far from the bar code read device that a read error is likely, and when the symbol surface 4 is out of the read range of the bar code read device. When a bar unexpectedly comes in the read range of the device, the laser beam 11 will not hit the eyes of persons near the bar code read device. The bar code read device does not emit the laser beam 11 until the symbol surface 4 reaches a position where the bar code on the surface is legible to the bar code read device. There is no need to operate switch 15 every time the bar code read device is to be used to read a bar code. It automatically starts the bar code read operation. Additionally, the operator can forcibly start the bar code read operation of the bar code read device by operating switch 15. This feature of the bar code read device may be utilized, for example, in a case where the symbol surface 4 is located greatly apart from the bar code read device. In this case, an operator lays the bar code read device at the bar code on the symbol surface 4, and operates the switch 15 to read the distant bar code.

The light source 10, which is used for judging the relative position of the symbol surface 4, is constantly driven to emit light. The light beam 13 is of such a low intensity that even if it directly hits someone's eyes, it is not harmful. Approximately 0.1 mW of the light source 10 is sufficient. The wave length of light from source 10 is selected to be equal to a peak wave length of the silicon photodiode, which is widely used for the sensor of this type of the device. The wave length is preferably 900 nm at which the relative luminous efficiency of the human being is low. If a light source of the type which emits a light beam, not sharp, such as a bare light emitting diode and a semiconductor laser, is used for the light source 10, the resultant bar code read device will have a more improved safety.

Thus, the bar code read device of the present embodiment automatically starts the bar code read operation if the symbol surface 4 is set at a position where the bar code read device can read the bar code. When a large amount of data must be read for data gathering, the bar code read device can efficiently proceed with the data collection. Further, when the symbol surface 4 is not present at the read-possible position, the laser source 2 and the scanner are not driven and the laser beam L1 will not enter the eyes of persons near the device. As an added feature, power consumption is reduced. There is no need for the setting of the emitting direction of the laser beam at a fixed target position when it detects the symbol surface. There is no need to control the direction of the scanner, simplifying the construction of the bar code read device.

Control circuit 14 may be arranged such that when laser source 2 is driven, control circuit 14 may send to drive circuit 11, through a signal line 16, a control signal to stop the emission of light from the light source 10. Such an arrangement reduces power consumption. In this arrangement wherein light sources 2 and 10 are controlled, laser beam 11 is not confused with the light beam 13, and there is no need of using the different modulating frequencies for the laser beam 11 and the light beam 12.

The confusion of the laser beam 11 with the light beam 13 may be removed in the following way. The wave lengths of the respective light beams are selected to be different from each other. The detect wave length bands of the first and second detecting circuits 5 and 12 are adapted to receive light from only their respective light sources by using optical filters. In this case, the modulating frequencies of the light beams 11 and 13 may be equal to each other.

A pulse drive method is employed for modulating the laser beam L1 and the light L3. In a case where a lamp and a gas laser are used for the light sources 2 and 10, a high speed shutter, for example, may be placed in the optical paths of the emitted light beams.

In a special situation where there is no need to take precaution against disturbance light, the modulated light beam may be only one light beam, the laser beam L1 or the light beam L3, in order to avoid the confusion of the reflected lights L2 and L4.

The power consumption by the light source 10 may be reduced by driving the light source 10 at intervals of 1 Khz or less. The figure of 1 KHz. is selected because 1 KHz. is the spatial frequency of the bar code when the scanning speed of the fat bar code is slow.

Figure 2:
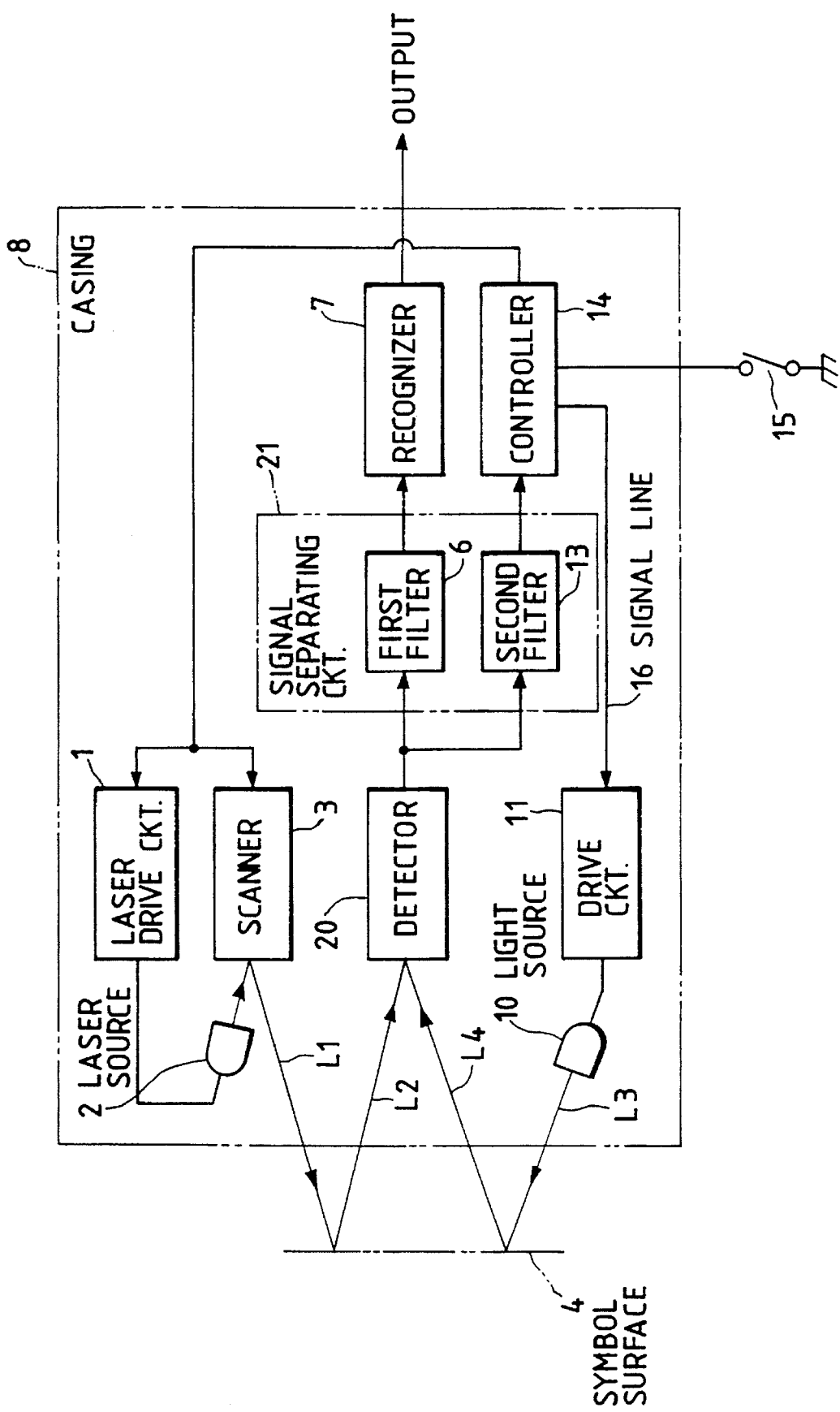
FIG. 2 is a block diagram of a second embodiment of a bar code read device according to the present invention.

FIG. 2 is a block diagram of a second embodiment of a symbol read device according to the invention. Throughout the figures, like or equivalent portions from one embodiment to another are designated by like reference numerals and such like or equivalent portions are not re-described. In the second embodiment, a single detecting circuit 20 is utilized instead of separate detecting circuits such as circuits 5 and 12 in the FIG. 1 embodiment. Detecting circuit 20 includes a photo diode for detecting the light L2 and L4 reflected from the symbol surface 4, which respectively correspond to light L1 and L3. The output signal of the detector circuit 20 is applied to a signal separating circuit 21 including first and second filters 6 and 13.

A laser drive circuit 1, as in the first embodiment, pulse-drives laser source 2 at a first frequency f1, and a drive circuit 11 likewise pulse-drives a light source 10 at a second frequency f2. Accordingly, an output signal of filter 6, having a pass band with a center frequency f1 represents the component of the reflected light L2 of the laser beam L1 that is extracted from the output signal of the detecting circuit 20. Similarly, an output signal of the filter 13, having a pass band with a center frequency f2 represents the component of the reflected light L4 from light source 10 that is extracted from the output signal of the detecting circuit 12. Accordingly, a recognizing circuit 7 can well recognize the bar code, free from the adverse effect of the reflected light L4. The controller 14 can judge whether or not the symbol surface 4 is located at such a position as to ensure a reliable reading of bar codes, while being free from the adverse effect by the laser beam 11.

The second embodiment, may be constructed at a lower cost than the first embodiment, because of use of only one detector.

Also in the second embodiment, the light source 10 may be constantly driven or it may be stopped when the laser source 2 and the scanner 3 are driven. The latter case may reduce the power consumption by the device.

Figure 3:
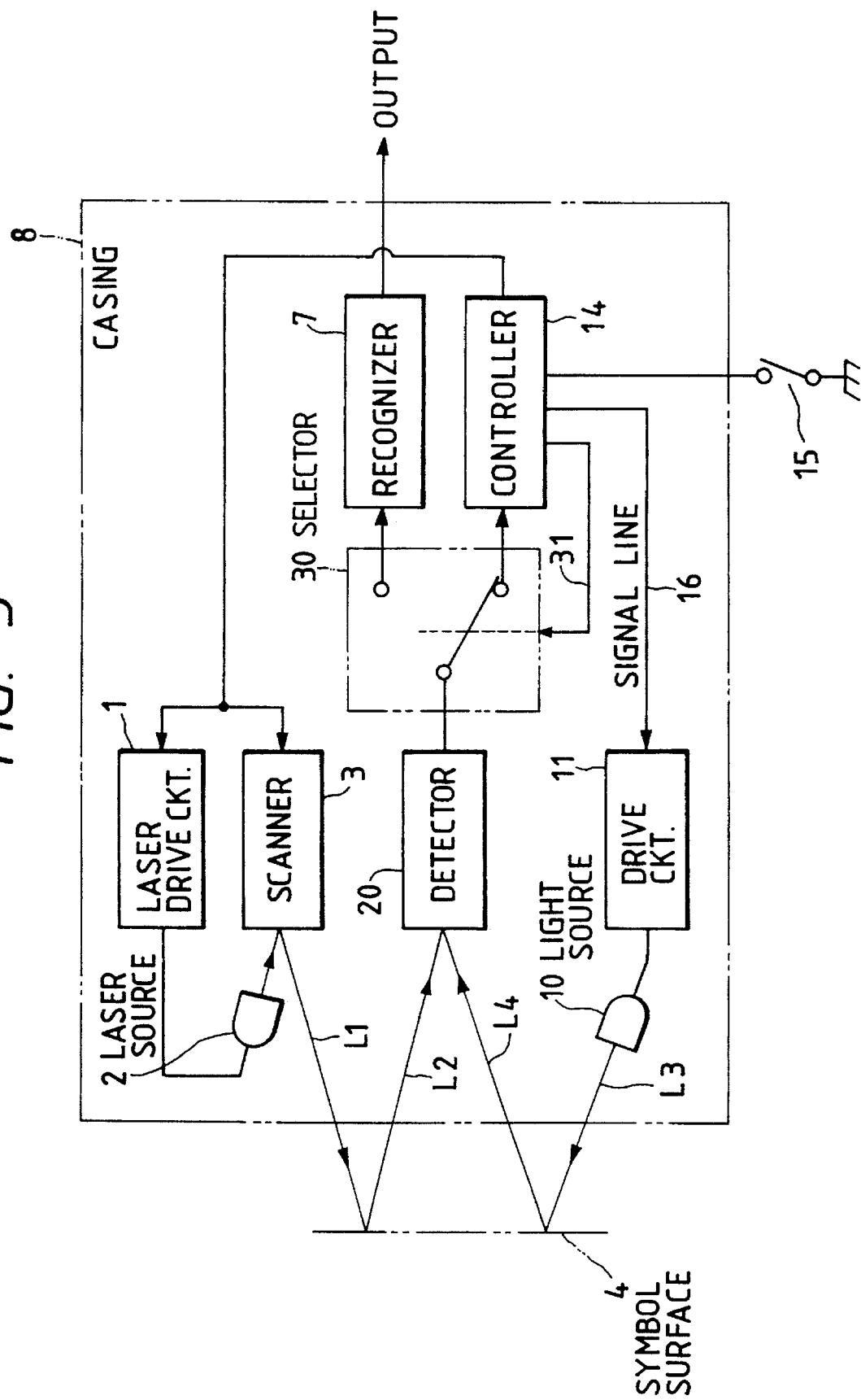
FIG. 3 is a block diagram of a third embodiment of a bar code read device according to the present invention.

FIG. 3 is a block diagram of a third embodiment of a symbol read device according to the present invention. As in the FIG. 2 embodiment, a single detecting circuit 20 is used. However, in this embodiment, an output signal from detector 20 is selectively coupled, by a selector 30 operating as a signal separator, to either recognizing circuit 7 or to controller 14. Selector 30 selects its output in response to a control signal from controller 14.

Controller 14 applies to the laser drive circuit 1 or the drive circuit 11 a control signal to selectively drive the laser source 2 or the light source 10. When outputting a control signal to drive the light source 10, it outputs onto the line 31 a control signal to cause the selector 30 to switch to the controller 14. When outputting a control signal to drive the laser source 2, it outputs a control signal to cause the selector 30 to switch the output from detector 20 to recognizing circuit 7.

Using this selection arrangement, the component of the output signal of the detector 20, which corresponds to the reflected light L2, will not be applied to the controller 14. Also the component of the output signal of the detector 20, which corresponds to the reflected light L4, will not be applied to the recognizing circuit 7. Therefore, there is no confusion of the reflected light beams L2 and L4 even though there is not provided first and second filters as in the embodiment of FIG. 2.

In the FIG. 3 embodiment, there is no need to use different modulating frequencies for the light beams L1 and L3 or different wave lengths of those beams, in order to discriminate the beams one from the other.

Figure 4:
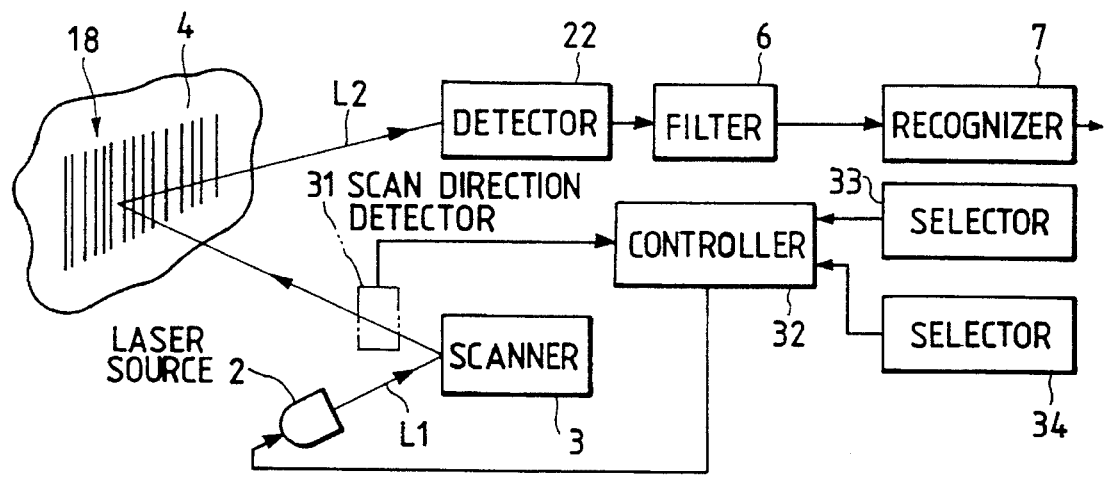
FIG. 4 is a block diagram of a bar code read device according to the present invention.

FIG. 4 is a block diagram of another arrangement of a symbol read device according to the present invention. In this embodiment there is no positional light source separate and distinct from light source 2. A laser beam L1 emitted by a laser source 2 passes through a scanner 3 which may include a polygon mirror, or the like. A beam from scanner 3 passes through an opening in casing 8 (not shown in this figure) and is directed toward a bar code 18.

The laser beam L1 is scattered on a symbol surface 4. Reflected light L2 is received by a detector 22 which may include a photo diode, or the like. An output of detector 22 is coupled to a recognizing circuit 7 through a filter 6 having a pass band centered at a first frequency f1. The recognizing circuit 7 converts an output signal of the filter 6 into a binary (two-value) signal by which information representing the bar code 18 is reproduced.

Laser source 2 is pulse-driven by the first frequency f1 which is much higher than a spatial frequency of the bar code 18. Pulse driving laser source 2 reduces power consumption with respect to driving laser source 2 continuously. The component of the frequency f1 is extracted by the filter 6 so that the interference by a light disturbance is removed, and the bar code is accurately read.

A scan-direction detector 31 detects the three scan directions. Detector 31 is placed on an optical path from the scanner 3 to the symbol surface 4. A signal from detector 22 is processed and eventually used to control a beam emitting controller 32 for controlling the output operation of the beam emitter 11. Controller 32 pulse-drives the beam emitter 11 at the first frequency f1. That is, the controller 32 controls an average output power of the laser beam L1 emitted from the beam emitter 11 by a duty ratio of a turn-on/turn-off of the beam emitter 11.

The beam emitting controller 32 is coupled to an output of a selector 33 for selecting a multi-directional scan mode for all of the three scans or a unidirectional scan mode for only one of the three scans. Controller 32 is further coupled to receive an output from a selector 34 for selecting the scan direction in the unidirectional scan mode.

Figure 5:
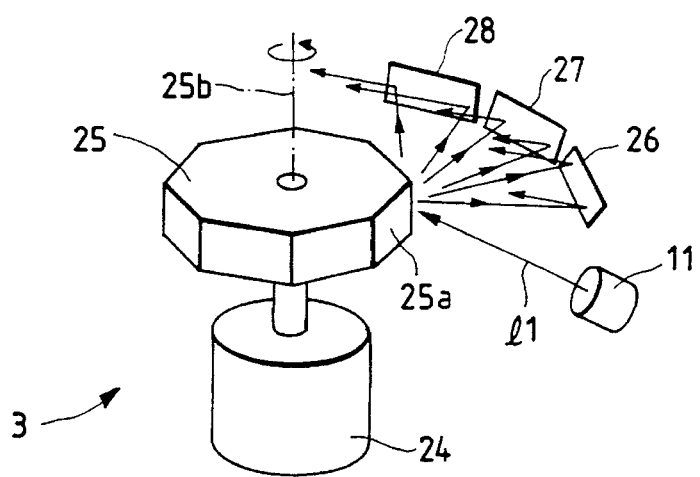
FIG. 5 is a perspective view of the scanner.

Scanner 3 is arranged as shown in FIG. 5. Plane mirrors 26, 27, and 28 are disposed around a polygon mirror 25. The various side face surfaces, such as surface 25a, of polygon mirror 25 are polarized reflecting surfaces that are slanted at predetermined angles with respect to an axial line 25b. Polygon mirror 25 is rotated at a fixed angular speed by a motor 24.

Figure 7:
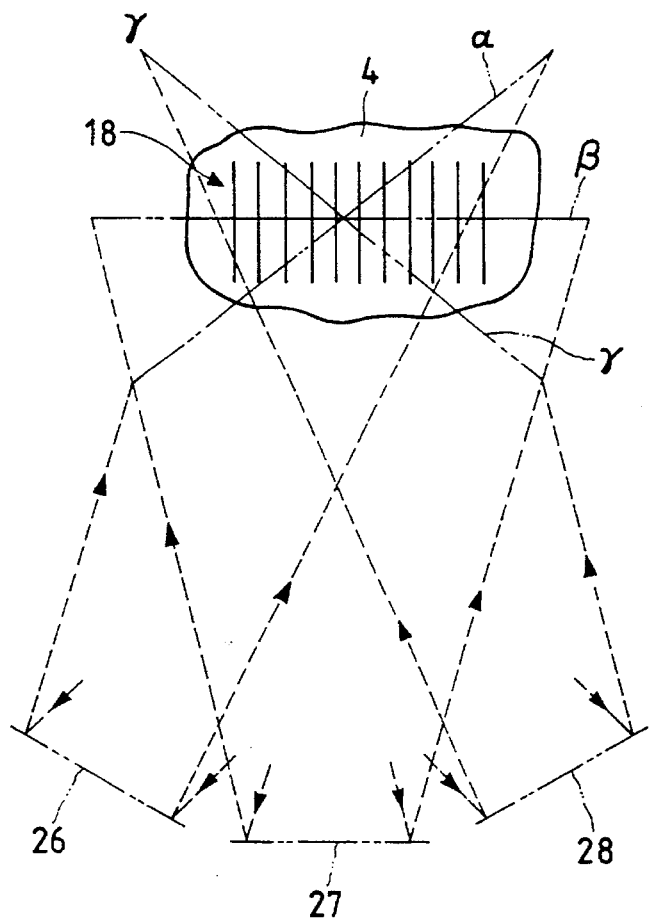
FIG. 7 is a view explaining how the scanner scans a symbol surface.

FIG. 7 is an explanatory diagram showing how the bar code 18 on symbol surface 4 is scanned by scanner 3. With the rotation of the polygon mirror 25, an incident angle of the laser beam on each reflecting surface 25a varies, so that the laser beam from the polygon mirror 25 is first incident on the plane mirror 26, then on plane mirror 27 and then on mirror 28. The laser beam reflected from the plane mirror 26 forms a scanning line α on symbol surface 4. When the polygon mirror 25 is further rotated, the laser beam from the mirror 25 is incident on the second plane mirror 27, which forms a scanning line β on the symbol surface 4. Then, the laser beam from the mirror 25 is incident on the third plane mirror 28, and the laser beam reflected thereby forms a scanning line γ (greek symbol tau) on the symbol surface 4. In this way, the laser beam forms the scanning lines α, β, and γ of different directions on the symbol surface 4.

If any of those scanning lines α, β, and γ moves across the entire bar code 18, the bar code 18 can be read using the output signal of detector 22. In the description to follow, the scans of the bar code 18 by the laser beam L1, which form the scanning lines α, β, and γ, will be referred to "α-direction scan", "β-direction scan", and "γ-direction scan", respectively.

Figure 8:
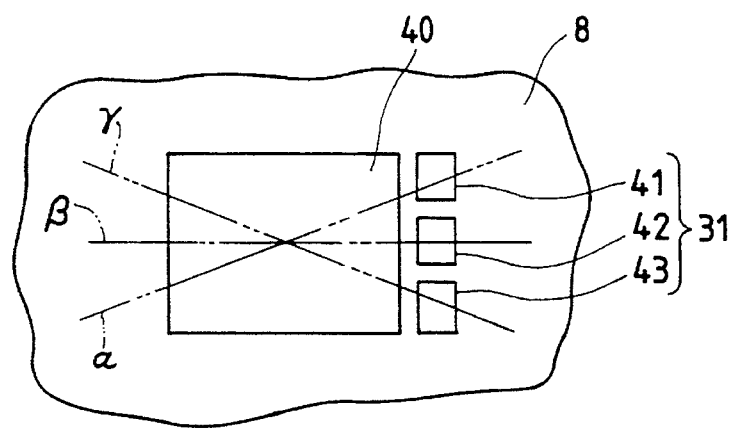
FIG. 8 is a view of the scan direction detector.

FIG. 8 is a plan view showing in schematic form, scan-direction detector 31. An opening 40, through which the laser beam L1 passes outwardly, is formed in casing 8. Three photodetecting elements 41, 42, and 43, arrayed near the peripheral side of the opening 40, are fixed on the inner wall of the casing 8. The photodetecting elements 41, 42, and 43, corresponding to scanning lines α, β, and γ, receive the laser beam L1 when the "α-direction scan", "β-direction scan", and "γ-direction scan" are terminated.

This particular embodiment is particularly useful in a scanning situation such as is used at a supermarket check out, where the orientation of bar codes to be read is indefinite. Selector 33 is operated to select the multi-directional scan mode. In this case, the symbol surface 4 is scanned with the laser beam L1 of which the average output power is equal for each one of the three "α-direction scan", "β-direction scan", and "γ-direction scan". Accordingly, the bar code 18 can be recognized by using the output signal of detector 22 when any of the scanning lines scans across the entire bar code 18. There is no need for strictly setting up the positional relationship between the bar code 18 and the symbol read device. Data can efficiently be entered on the basis of reading the bar code. Where a plurality of bar codes are arrayed side by side, use of the multi-directional scan mode allows the symbol read device to mistakenly read a bar code which is not the bar code to be read by an operator (undesired bar code). In such a case, all the operator has to do is select one of the α-scan direction, β-scan direction, and "γ-scan direction", to set up the unidirectional scan mode. In response to this, controller 32 increases the average output power (first value) of the beam emitter 11. For the scan of another direction, the average output power (second value) of the beam emitter 11 is decreased.

Figure 9:
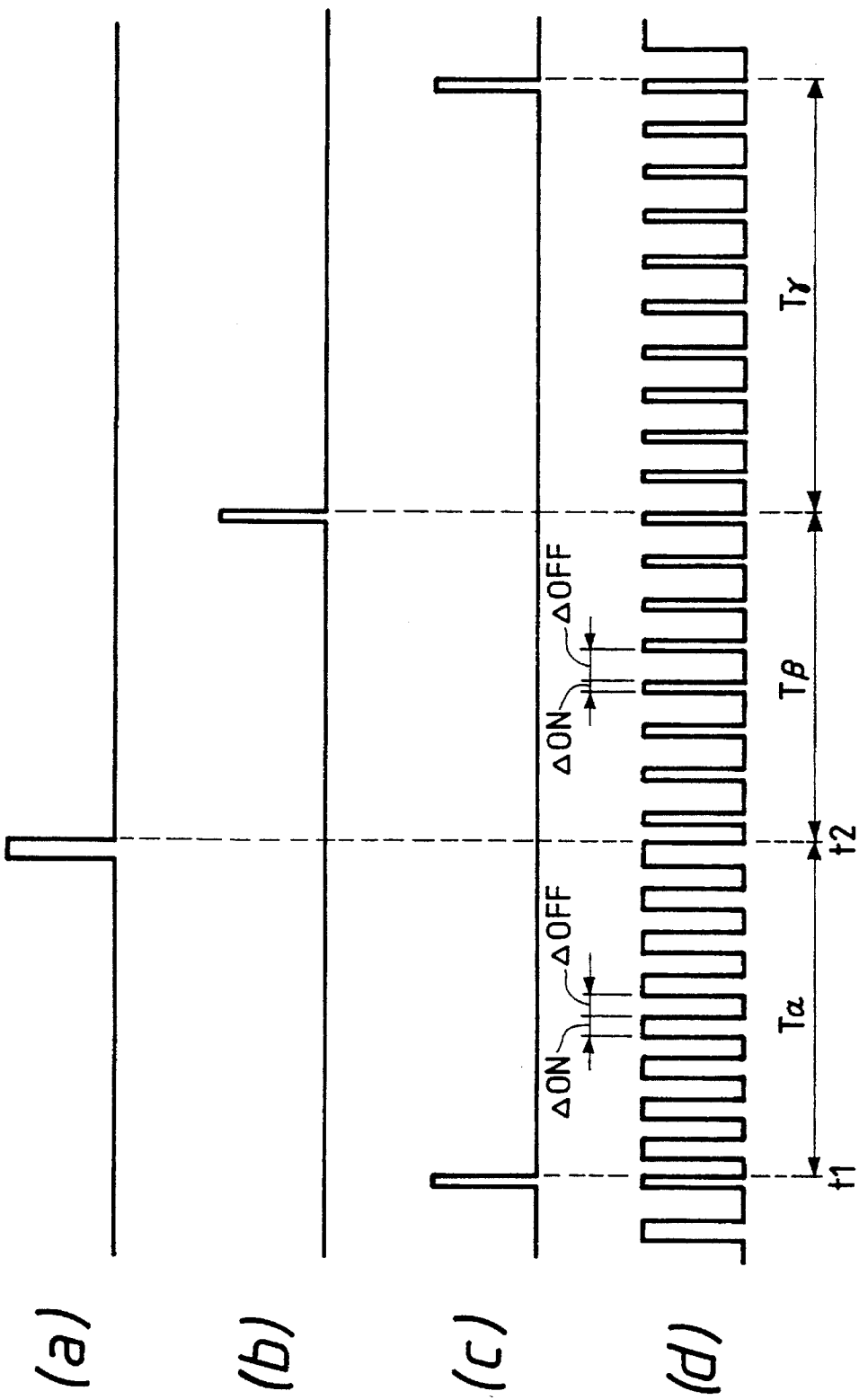
FIG. 9 is a timing chart showing an operation of the bar code reader when the unidirectional scan mode is executed upon selection of the α-direction scan.

FIG. 9 is a timing chart showing an operation of the bar code reader when the unidirectional scan mode is executed upon selection of the α-direction scan. FIGS. 9(a) through 9(c) show waveforms of the output signals of the photodetecting elements 41, 42 and 43 shown in FIG. 8. FIG. 9(d) shows an operation of the beam emitter 11. The "α-direction scan", "β-direction scan", and "γ-direction scan" are sequentially performed, so that the scan lines are formed in the order of ... α→β→γ... The laser beam 11 emitted from the beam emitter 11 being pulse driven is detected by the photodetecting element 43, and the "γ-direction scan" terminates. Then, the beam emitting controller 32 increases a ratio of the turn-on time ΔON to the turn-off time ΔOFF during a period Tα from the termination of the "γ-direction scan" till the photodetecting element 41 detects the laser beam 11. As a result, the "α-direction scan" during the period Tα is performed by the laser beam 11 of a large average output power. At time t2, the photodetecting element 41 detects the laser beam 11 and the "α-direction scan" terminates. Then, the beam emitting controller 32 decreases a ratio of the turn-on time ΔON to the turn-off time ΔOFF, so that the average output power of the laser beam 11 is decreased. In this way, the "β-direction scan" is performed by the laser beam 11 of a low average output power during a period Tβ from the termination of the "γ-direction scan" till the photodetecting element 42 detects the laser beam 11. Also during a period Tγ from when the photodetecting element 42 detects the laser beam 11 until the photodetecting element 43 detects the laser beam 11, the "γ-direction scan" is performed by the laser beam 11 of a low average output power.

Thus, only the "α-direction scan" is performed using the laser beam 11 of a large average output power. During the periods of the "β-direction scan" and the "γ-direction scan", the output signal of the detector 22 is too small to recognize the bar code. Therefore, the bar code is read only in the "α-direction scan".

As described above, when using the bar code reader of the present embodiment, an operator may select either of the multi-directional scan mode to read the bar code by the three-direction scan or the unidirectional scan mode to read bar code by the one-direction scan. Where a plurality of bar codes are closely arrayed, the use of the multi-directional scan mode allows the bar code read device to mistakenly read a undesired bar code so that the data entry work becomes inefficient, the unidirectional scan mode is selected. Thus, the operator may select the unidirectional scan mode or the multi-directional scan mode according to the condition of using the bar code reader, leading to a remarkable improvement of the data entry work efficiency. The scan direction in the unidirectional scan mode may be selected by the selector 34. The reason for this is that the adaptability of the bar code reader for various use conditions is improved. When this feature is incorporated into a bar code reader fixed in a position above a belt conveyer, the bar code reader can read bar codes of different orientations, attached to articles conveyed by the conveyer. When the feature is incorporated into the hand-held type bar code readers, the scan direction may be selected according to the skillful hand of an operator or his/her own taste, leading to a further improvement of data entry work efficiency.

Also in the present embodiment, when the unidirectional scan mode is selected by the selector 33, the scan in the selected scan direction is performed by the large power laser beam, while the scans in the remaining scan directions, by the small power laser beam. Accordingly, if each output value is properly selected, the bar code may be read in the multi-directional scan mode when a distance between the bar code and the bar code reader is short, and it may be done in the unidirectional scan mode when the distance is long. If it is so done, the undesired bar code will not be read when the distance is long, and when the distance is short, the positional relationship between the bar code and the bar code reader need not be precisely set.

In the present embodiment, when the unidirectional scan mode is selected, the emission of the laser beam L1 may be stopped during the periods of the scans other than the "α-direction scan". In this case, however, the arrangement of the scanner shown in FIG. 8 cannot detect the scan direction.

Figure 11:
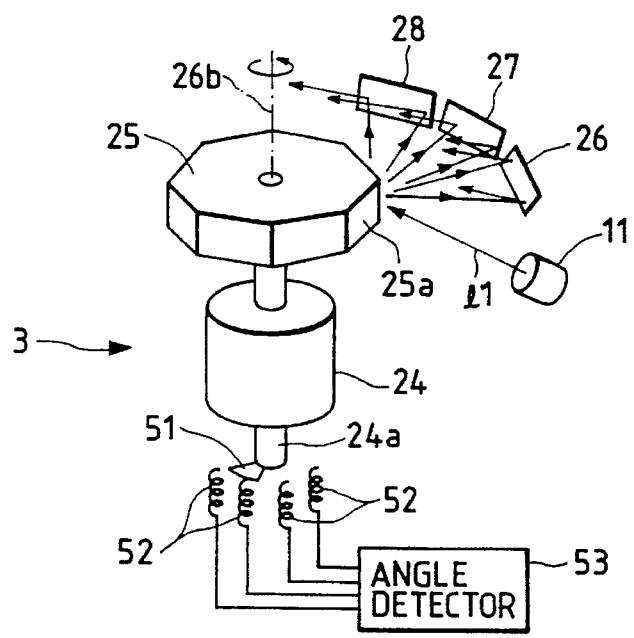
FIG. 11 is a schematic diagram showing an alternative embodiment of a scan direction detector.

To cope with this, an alternative arrangement of scanner 3 is shown in FIG. 11. A permanent magnet 51 is fixed to a drive shaft 24a of the motor 24 for rotating the polygon mirror 25. Thus, magnet 51 rotates with drive shaft 24a. A plurality of coils 52 are disposed close to a path along which the permanent magnet 51 rotates. An output signal of each of the coils 52 is applied to an angle detector 53 so that an angular position of mirror 25 can be detected. Thus, the device can recognize which of the plane mirrors 26, 27 or 28 reflects the laser beam L1 from the beam emitter 11. Accordingly, it can detect "α-direction scan", "β-direction scan", or "γ-direction scan". In a symbol read device incorporating a scanner 3 as shown in FIG. 11, the output signal of the detector 53 is applied to controller 32 (shown in FIG. 4), to stop the emission of the laser beam 11 from the beam emitter 11 in the "β-direction scan" and the "γ-direction scan".

In the embodiment as mentioned above, when the bar code reader is in the unidirectional scan mode, the average output power of the laser beam L1 is reduced (or stopped) during the scanning operation of a non-select scan direction. The frequency of the pulse signal for turning on the beam emitter is switched to the second frequency different from the first frequency; the average output power of the laser beam L1 is not reduced.

Let us consider a case where the "α-direction scan" is selected by the selector 33 and the unidirectional scan mode is selected by the selector 33. When the "α-direction scan" is performed according to the output signal of the scan direction detector 31, the beam emitting controller 32 sets the pulse turn-on frequency of the beam emitter 11 at the first frequency as the passing frequency of the filter 23. During the periods of the "β-direction scan" and the "γ-direction scan", the beam emitter 11 is turned on by the second frequency as the frequency out of the passing frequency band.

As a result, the output signal of the detector 22, which is produced in other scans than the "α-direction scan", is removed by the filter 23. Accordingly, recognizing circuit 7 recognizes the bar code depending only on the "α-direction scan". In this way, the unidirectional scan is substantially realized.

Figure 6:
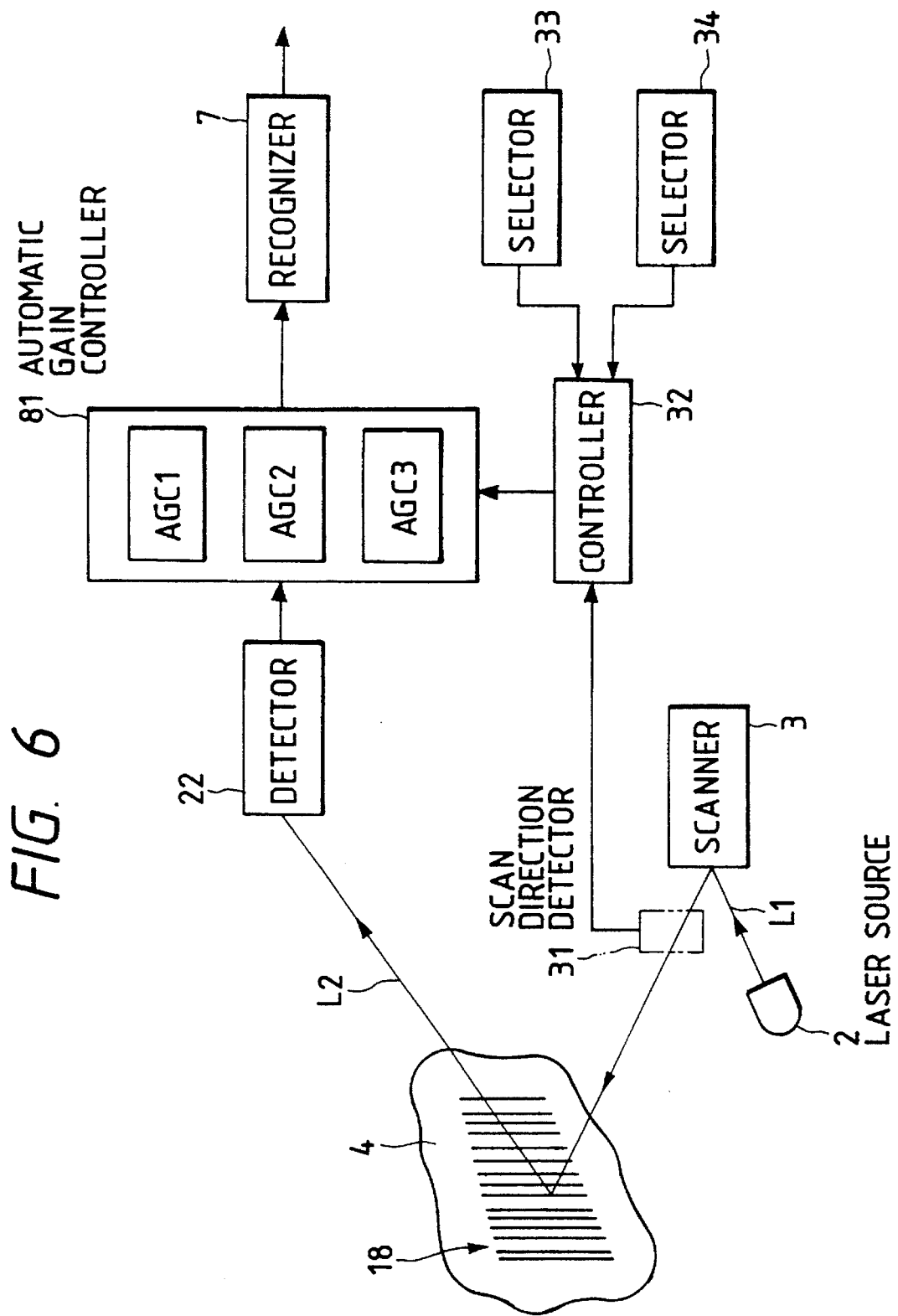
FIG. 6 is a block diagram of a bar code read device according to the present invention.

FIG. 6 is a block diagram of another embodiment of a symbol read device according to the present invention. This arrangement is similar to that shown in FIG. 4, except that the output signal of detector 22 is applied to an automatic gain controller 81 having a plurality of automatic gain control circuits AGC1 to AGC3.

Automatic gain control circuits AGC1 to AGC3 respectively correspond to the "α-direction scan", "β-direction scan" and "γ-direction scan". According to the output of detector 31, controller 32 selects the automatic gain control circuit AGC1 during a period in which the laser beam L1 forms the scan line α shown in FIG. 7. It selects the automatic gain control circuit AGC2 during a period that the laser beam L1 forms the scan line β. It selects the automatic gain control circuit AGC3 during a period that the laser beam L1 forms the scan line γ. The automatic gain control circuits AGC1, AGC2, and AGC3 are sequentially selected as the scan by the laser beam 11 progresses.

Figure 10:
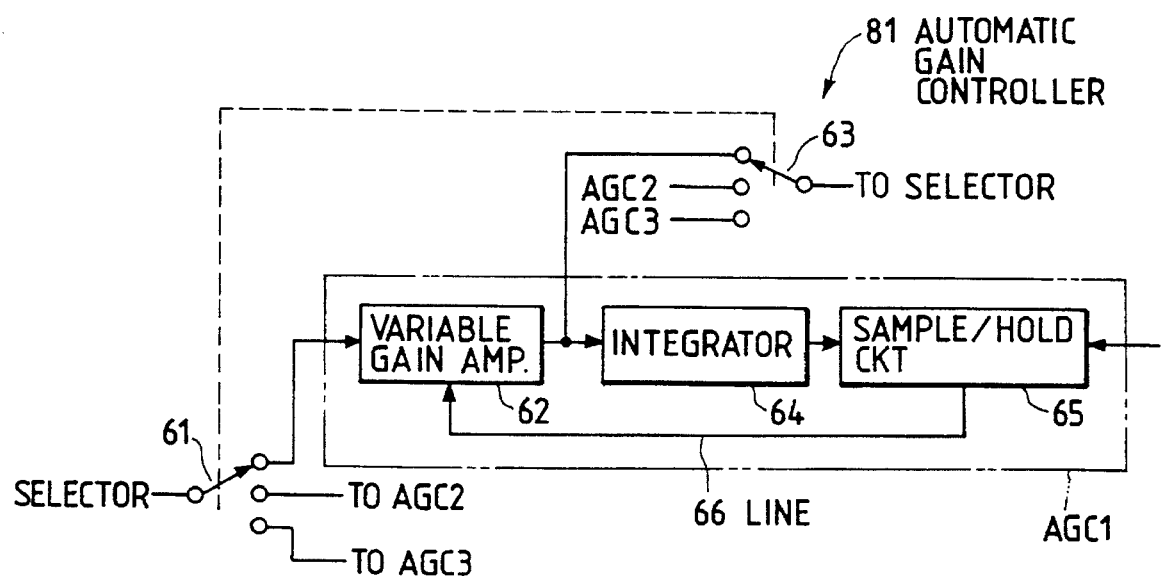
FIG. 10 is a block diagram showing an automatic gain control circuit group 23.

FIG. 10 is a block diagram of automatic gain controller 81. Only automatic gain control circuit AGC1 is shown because the others are similarly arranged.

An output signal of detector 22 is applied to any of the automatic gain control circuits AGC1 to AGC3, through a selector 61 which is operated, by the controller 32, according to the detect result from the scan direction detector 31. The output of detector 22 is applied to a selector 63 which is interlocked with the selector 61. During the period of the "α-direction scan", selectors 61 and 63 are both connected to the automatic gain control circuit AGC1. During the period of the "β-direction scan", the select circuits are both connected to the automatic gain control circuit AGC2. During the period of the "γ-direction scan", those circuits are both connected to the automatic gain control circuit AGC3.

The output signal of a variable gain amplifier 62 is applied to an integrator 64. The integrator 64 is used for calculating an average value of the output signal of the variable gain amplifier 62 during the period of one scan. The output signal of integrator 64 is applied to a sample/hold circuit 65. The sample/hold circuit 65 samples and holds the output signal of the integrator 64 at the termination of the "α-direction scan" in response to a sampling clock signal derived from the controller 32. The voltage that is held is applied as a control voltage to the variable gain amplifier 62, through a signal line 66, and determines a gain of the amplifier.

For the details of the variable gain amplifier 62, the integrator 64, and the sample/hold circuit 65, reference is made to Japanese Patent Application Unexamined Publication No. 63-93950, which is incorporated herein by reference.

During the period of the "α-direction scan", the output of detector 22 is amplified at a gain set by the automatic gain control circuit AGC1. During the period of the "β-direction scan", the output signal of the detector 22 is amplified at a gain set by the automatic gain control circuit AGC2. During the period of the "γ-direction scan", the output signal of the detector 22 is amplified at a gain set by the automatic gain control circuit AGC3. Thus, the gain for the output signal of the detector 22 in the scan of one direction is not influenced by that for the output signal in the scan of other directions. A gain of the automatic gain control circuit AGC1 in the present "α-direction scan" is determined depending on the output signal level of the detector 22 in the previous "α-direction scan", and hence it is not influenced by the output signals of the detector 22 in the "β-direction scan" and the "γ-direction scan". The same thing is true for the "β-direction scan" and the "γ-direction scan". Even if the regular reflection light from the symbol surface or an object of high reflectivity, for example, metal, in the "β-direction scan" or "γ-direction scan" is incident on the detector 22, a gain set by the automatic gain control circuit AGC1 corresponding to the "α-direction scan" will not be extremely small. As a result, the bar code read device can recognize the bar code 18 read through "α-direction scan", free from the influence by the regular reflection light, and the like.

As described above, the bar code read device can minimize the impairment of the read performance due to the regular reflection light, though it uses the automatic gain control circuits. In addition to this, the device can accurately read symbols in various conditions.

The operation of the selector 33 shown in FIG. 6 will now be described. In the supermarket check out situation, described above, the read mode by the multi-directional scan is selected so as to provide an easy handling of the bar code read device when it reads a bar code. Where a plurality of bar codes are arrayed side by side, if the symbol recognition is performed through all of the α-, β-, and γ-direction scans, the bar code read device may mistakenly read a bar code, which is not the bar code to be read.

In such a case, an operator selects the "α-direction scan", "β-direction scan" or "γ-direction scan" by means of the selector 34, and sets up the unidirectional scan mode by means of the selector 34. In response to this, the controller 32 permits only the automatic gain control circuit corresponding to the selected scan direction in the automatic gain controller 81 to operate, which prohibits the remaining automatic gain control circuits from operating (that is, forcibly sets the gain to "0"). More specifically, the selector circuits having terminals not connected to any of the automatic gain control circuits AGC1 to AGC3 are used for the select circuits 61 and 63. Under control of the controller 32, the control circuits are set up in either of two states, one in which they are connected to the automatic gain control circuit corresponding to the scan direction selected by selector 34, and the other in which they are not connected to any of the automatic gain control circuits.

When the "α-direction scan", for example, is selected by selector 34, only the automatic gain control circuit AGC1 is allowed to operate, while the remaining circuits AGC2 and AGC3 are prohibited from operating. The controller 32 connects the select circuits 61 and 63 to the automatic gain control circuit AGC1 only when the "α-direction scan" is performed. Accordingly, the automatic gain control circuit AGC1 controls the variable gain amplifier 62 so as to amplify the output signal of detector 22 in the present "α-direction scan" at the gain set by a control signal that is held by the sample/hold circuit 65 in association with the output signal of detector 22 in the previous "α-direction scan".

For the "β-direction scan" and the "γ-direction scan", the gain for the output signal of the detector 22 is zero (0). Accordingly, the bar code read device recognizes the symbol surface 4 depending only on the "α-direction scan". When a plurality of bar codes are closely arrayed and use of the multi-directional scan mode leads to a mistaken read of an undesired bar code and hence to make the data entry work inefficient, an operator can cope with the problem by selecting the unidirectional scan mode. Thus, when using the bar code read device of the present embodiment, the operator may select the unidirectional scan mode or the multi-directional scan mode according to the use conditions of the bar code read device, remarkably improving the data entry work through the bar code read.

The scan direction in the unidirectional scan mode may be selected by selector 34 to enhance the adaptability of the symbol read device for use under various conditions. When this feature is incorporated into a bar code reader fixed at a position above a belt conveyer, the bar code reader can read bar codes of different orientations, attached to articles conveyed by the conveyer. When the feature is incorporated into the hand-held type bar code readers, the scan direction may be selected according to the skillful hand of an operator or his own taste, leading to a further improvement of data entry work efficiency.

The present embodiment may be modified such that when the unidirectional scan mode is designated by the selector 33, the gain corresponding to the scan direction not selected by the selector 34 is not set to 0, but is set to a fixed value given when the symbol surface 4 is located close to the device. Specifically, when the "α-direction scan" is selected by the selector 34, a fixed voltage is used as a control signal to determine gains of the automatic gain control circuits AGC2 and AGC3 corresponding to the "β-direction scan" and the "γ-direction scan".

The bar code read device thus arranged may be operated in the following manner. When the distance between the bar code and the symbol surface is short, the multi-directional scan mode is selected and the bar code recognition processing is performed using the data gathered through the scan. When the distance is long, the unidirectional scan mode is selected and the bar code recognition processing is performed using the data gathered through the scan. Therefore, the problem that when reading a distant bar code, the bar code read device may mistakenly read an undesired bar code can be solved. Additionally, roughly setting of a positional relationship between the bar code and the device suffices when reading near bar codes, suffices for securing efficient data entry work.

Figure 12:
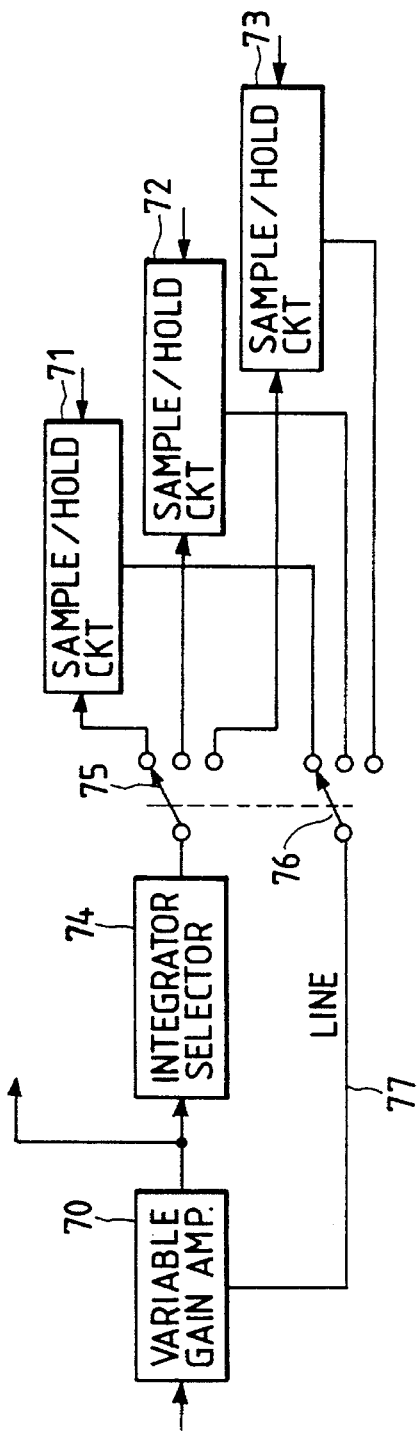
FIG. 12 is a block diagram showing an alternative embodiment of an automatic gain control circuit.

FIG. 12 is a block diagram of an alternative embodiment of automatic gain controller 81. As shown, a single variable gain amplifier 70 is provided for the three scan directions, "α-direction scan", "β-direction scan", and "γ-direction scan". Three sample/hold circuits 71, 72 and 73 are provided for the three scans, respectively. In operation, a signal amplified by the variable gain amplifier 70 is applied to an integrator 74 which in turn integrates the signal over a period corresponding to the scan by the laser beam L1. The integrated signal, after each scan terminates, is applied through a selector 75 to the corresponding sample/hold circuit 71, 72 or 73 where it is sampled and held. Each of the sample/hold circuits 71 to 73 receives a sampling signal from the controller 32 according to the output signal of the scan direction detector 31.

One of the output signals of the sample/hold circuits 71 to 73 is selected by the selector 76, and is applied, as a control signal to determine a gain of the variable gain amplifier 70, through a line 77 to the amplifier 70. Selectors 75 and 76, interlocked with each other, are operated by a control signal from the controller 32. During the period of the "α-direction scan", those circuits are connected to the sample/hold circuit 71. During the period of the "β-direction scan", those circuits are connected to the sample/hold circuit 72. During the period of the "γ-direction scan", those circuits are connected to the sample/hold circuit 73.

It is evident that the arrangement as described above can achieve substantially the same operation and effects as those of the previous embodiment. When comparing with the arrangement of automatic gain controller shown in FIG. 10, the required numbers of the variable gain amplifiers and the integrator are small in the present embodiment, and hence its construction is more simplified.

Figure 13:
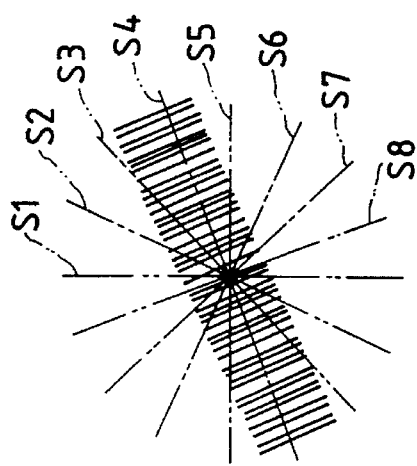
FIG. 13 is a view showing an omni scan process.

Another embodiment of the invention will now be described. In the embodiments as mentioned above, three scan modes are used and the automatic gain control circuits are provided for those scan modes, respectively. As shown in FIG. 13, eight scan lines S1 to S8 of eight different directions may be formed by the laser beam L1. In this case, the positions scanned by the scan lines closely located are little different from each other. Therefore, use of equal gains for the output signals of the detector for two to three scan lines closely located, becomes little problematic in practical use.

In the present embodiment, the scan lines S1 to S8 are gathered into three groups, S1 to S3, S4 to S6, and S7 and S8. The automatic gain control circuit shown in FIG. 10 is provided for each group (in the arrangement of FIG. 12, the sample/hold circuit is provided for each group).

In the arrangement of the present embodiment, the number of the automatic gain control circuits (or the sample/hold circuits) may be smaller than that of the scan lines. Therefore, when the present embodiment is applied for the case where a number of scan lines are used, the effects comparable with those of the first and second embodiments may be achieved by a lower cost.

Various embodiments have been presented in an effort to fully explain the invention. It should be understood, however, that the invention is not limited to the specific embodiments described in detail above. Rather, the principles of the present invention could be applied to other embodiments as well.

Figure 14:
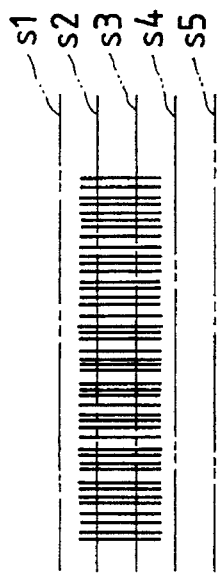
FIG. 14 is a view showing a raster scan process.

In describing embodiments using the omniscan mode, it should be recognized that the rasterscan mode could alternatively be used. Thus, the FIG. 13 and FIG. 14 type scans can be used in the alternative in any of the multiple scan arrangements.

In the case of raster scan mode, the automatic gain control circuits may be provided for the scan lines s1 to s5, respectively. Alternatively, scan lines s1 to s5 may be gathered into groups. An automatic gain control circuit is provided for each group of scan lines. The circuit shown in FIG. 12 may used for this type of the bar code read device.

The various embodiments including a discussion of omni scan are illustrated using three scan lines only. Of course the invention is not limited to the use of three such scan lines. The three line example makes it easy to illustrate and understand the invention. However, two or more lines could be effectively utilized. The selectors could be configured according to the number of different scan lines utilized.

The description of the preferred embodiments has been made in terms of a device intended to read bar codes. However, the principles of the invention are equally applicable to optical character reader (OCR) devices. Such devices scan symbols with a light beam in order to read symbols. It should be understood that the invention may be variously changed, altered and modified within the scope of the invention.

In the foregoing descriptions, it was indicated that the gain of the variable gain amplifier for amplifying the output signal of the detector is set for each scan line or scan line group. The gain of the amplifier can be adjusted as necessary and can be independent of the gain likewise set for another scan line or scan line group.

In an situation where the detector receives the regular reflection light from the symbol surface during a scan or in a situation where a scan line group moves across an object of a high reflectivity, such as metal, and light of high intensity is incident on the detector, if the gain for the scan line or the scan line group becomes extremely small, such an extremely small gain will not be set for another scan line or scan line group. Therefore, the symbol read device can accurately read symbols using the output signal of the detector for the latter scan line or scan line group. Thus, the symbol read device of the invention, because of use of the automatic gain controller, can accurately read symbols in a wide read range and in various read conditions.

The symbol read device according to the present invention may include one or more selector positions for controlling the gains of the various scan lines as desired. They could be set individually, in groups, etc. For example one scan line could have a gain that is automatically controlled and the others could be fixed. This feature is very useful in a situation wherein many symbols are closely arrayed and an undesired symbol may be mistakenly read. A mistaken read can be avoided by specifying a scan line or a scan line group to be used for symbol recognition.

If the fixed value is set to a gain selected when a symbol is located within a short distance apart from the device, a distant symbol is recognized according to only the output signal of the detector caused by a scan line or a scan line group, realizing an accurate symbol read. A near symbol is recognized according to the output signals of the detector by all of the scan lines, providing an excellent handling of the symbol read device when reading symbols.

When the symbol surface is placed at the symbol-read-impossible position, the beam emitter and the scanner are not driven and a symbol read operation is not performed. When the symbol surface is at the symbol-read-possible position, the beam emitter and the scanner are automatically controlled under control of the controller, so that the symbol read operation is performed.

Accordingly, when a great number of symbols are read for data entry, the symbol read device can efficiently proceed with the data entry work, because the switching operation to instruct the start of the symbol read operation is not required in the image read device. When the symbol surface is placed greatly apart from the read device such a distance as to provide an unreliable read operation or the symbol surface is out of the read field of the read device, the beam emitter and the scanner are not driven, and the laser beam will not enter the eyes of the persons near the device, improving the safety of the device. Further, the device will not mistakenly read the symbol greatly apart from the read device.

Furthermore, in the bar code read device, unlike the conventional one, it is not necessary to set the direction of the laser beam emission at a fixed target position when the device detects the symbol surface. For this reason, there is no need of a controller to control the scanner to change the beam emitting direction, leading to a simplified construction of the bar code read device.

What is claimed is:

1. A symbol read device comprising:

means for emitting a light beam;

means for scanning the light beam over a surface bearing a symbol to be read;

a second light source, separate and distinct from the light beam emitting means, for illuminating the surface;

means for detecting light reflected from the symbol surface and generating a detection signal indicative thereof;

detection signal separating means for separating the detection signal into two components, wherein a first component corresponds to reflected light of said light beam emitting means and a second component corresponds to reflected light of said second light source;

recognizing means for processing said first component, corresponding to reflected light of said light beam emitting means, so as to recognize the symbol to be read; and controlling means, responsive to said second component corresponding to reflected light of the second light source, for controlling the light beam emitting means and the scanning means.

2. A symbol read device comprising:

means for emitting a light beam;

means for modulating the light beam with a first frequency; and means for scanning the modulated light beam over a surface bearing a symbol to be read;

a second light source, separate and distinct from the light beam emitting means, for illuminating the surface;

means for modulating light from the second light source with a second frequency different from the first frequency, a detector for detecting light reflected from the symbol surface and generating a detection signal indicative thereof;

signal separating means for separating the detection signal into two components, wherein a first component corresponds to reflected light of the light beam emitting means and a second component corresponds to reflected light of the second light source; and recognizing means for processing said first component corresponding to reflected light of the light beam emitting means so as to recognize the symbol to be read;

controlling means, responsive to said second component corresponding to reflected light of the second light source, for controlling the light beam emitting means and the scanning means.

3. A symbol read device comprising:

means for emitting a light beam;

means for scanning the light beam over a surface bearing a symbol to be read;

a second light source, separate and distinct from the light beam emitting means, for illuminating the surface;

means for detecting light reflected from the symbol surface and generating a detection signal indicative thereof;

recognizing means for processing the detection signal so as to recognize the symbol to be read; and driving means, for selectively driving either said light beam emitting means or said second light source at any one time;

controlling means, responsive to said detection signal, for placing said symbol read device in either a reading mode or a stand-by mode, wherein:

1) said reading mode includes activating said light beam emitting means with said driving means and applying the detection signal to said recognizing means, and 2) said standby mode includes activating said second light source with said driving means and applying the detection signal to said controlling means.

4. A symbol read device comprising:

means for emitting a light beam;

means for scanning with the light beam a symbol surface bearing a symbol to be read, the scanning occurring in at least first and second scan directions;

detecting means responsive to the light beam emitting means for detecting light reflected from the symbol surface and generating a detection signal indicative thereof;

scan direction detecting means for determining a scan direction of the scanning means;

beam emitting control means for selectively controlling the light beam emitted by the light beam emitting means such that it has a first characteristic when the symbol surface is scanned in the first direction and the light beam has a second characteristic when the symbol surface is scanned in the second direction; and a select means for causing the symbol read device to operate in either a first mode wherein the light beam emitting means is controlled by the beam emitting control means or in a second mode wherein the output of the beam emitting means is not controlled by the light beam emitting control means.

5. A symbol read device comprising:

means for emitting a light beam;

means for scanning the light beam in at least first and second directions over a symbol surface bearing a symbol to be read;

detecting means for detecting light reflected from the symbol surface and generating a detection signal indicative thereof;

beam emitting control means for controlling the beam emitting means, said control means pulsing said light beam at a first frequency when the symbol surface is scanned in the first direction, and pulsing said light beam at a second frequency, different from the first frequency, when the symbol surface is scanned in the second direction;

scan direction detecting means for detecting the scan direction of the scanning means on the basis of the frequency said light beam is pulsed at;

filter means for extracting at least a first frequency component of the detection signal; and select means for causing the symbol read device to operate either in a first mode, wherein the light emitted from the beam emitting means is scanned in at least said first and second direction and controlled by the beam emitting control means, or in a second mode, wherein the light emitted from the beam emitting means is scanned in only a first direction and pulsed at only a first frequency.

6. A symbol read device according to claim 5 further comprising:

a scan select means for causing scanning to occur in a particular scan direction.

7. A symbol read device comprising:

first light source means for emitting first light in the form of a light beam modulated by a first frequency;

scanning means for scanning a symbol surface containing a symbol to be read with the light beam from the first light source;

second light source means for emitting second light modulated by a second frequency for illuminating the symbol surface;

detector means for receiving first and second light, reflected from the symbol surface and providing a detector signal indicative thereof;

a first filter having a pass band including the first frequency for filtering the detector signal and providing a first filtered signal responsive to the first light;

recognizing means for signal processing a signal from the first filter so as to recognize the symbol being read;

a second filter having a pass band including the second frequency for filtering the detector signal and generating a second filter signal; and control means for controlling, responsive to the second filter signal, the first and second light sources and the scanning means.

8. A symbol read device according to claim 7 further comprising a manually operable switch for controlling the control means so as to override the second filter signal.

9. A symbol read device comprising:

first light source means having a first wavelength for emitting first light in the form of a light beam;

scanning means for scanning a symbol surface containing a symbol to be read with the light beam from the first light source;

second light source means for emitting second light having a second wavelength for illuminating the symbol surface;

detector means for receiving first and second light, reflected from the symbol surface and providing a detector signal indicative thereof;

a first filter having a pass band including the first wavelength for filtering the detector signal and providing a first filtered signal responsive to the first light;

recognizing means for signal processing the first filtered signal so as to recognize the symbol being read;

a second filter having a pass band including the second wavelength for filtering the detector signal and generating a second filter signal; and control means for controlling, responsive to the second filter signal, the first and second light sources and the scanning means.

10. A symbol read device according to claim 9 further comprising a manually operable switch for controlling the control means so as to override the second filter signal.

11. A symbol read device comprising:

first light source means for emitting first light in the form of a light beam;

scanning means for scanning a symbol surface containing a symbol to be read with the light beam from the first light source;

second light source means for emitting second light for illuminating the symbol surface;

detector means for receiving first and second light, reflected from the symbol surface and providing a detector signal indicative thereof;

recognizing means for signal processing the detector signal so as to recognize the symbol being read; and control means for controlling, responsive to the detector signal, the first and second light sources and the scanning means; and selector means for selectively coupling the detector signal to either the recognizing means or the control means, the selector being controlled by the control means.

12. A symbol read device according to claim 11 further comprising a manually operable switch for controlling the control means so as to override the detector signal.

13. A symbol read device according to claim 11 further comprising means for selectively driving the first and second light source means to emit light at different times and operate the selector means in such a fashion that when the first light source is operative, the detector signal is coupled to the recognizing means and when the second light source means is operative, the detector signal is coupled to the control means.

14. A symbol read device comprising:

a laser beam source for emitting a laser beam;

means for pulse driving the laser beam source at a first frequency;

means for scanning the laser beam in different directions across a symbol surface having a symbol thereon to be read;

detector means for receiving light reflected from the symbol surface and generating a detector signal indicative thereof;

filter means, having a pass band including the first frequency, for filtering the detector signal and generating a filtered signal;

recognizing means for signal processing the filtered signal from the filter means and recognizing the symbol being read;

scan direction detector means for detecting which of the different directions the laser beam is being scanned and providing a signal indicative thereof;

beam controller means for controlling the pulse driving means, at least partially in response to the signal from the scan direction detector means;

first selector means for selecting whether the symbol read device will operate in a multi-direction scan mode or in a unidirectional scan mode and providing a signal to the beam controller means indicative thereof so the beam controller means will operate in accordance with the scan mode; and second selector means for controlling scan directions when the symbol read device is being operated in the multi-direction scan mode and providing a signal to the beam controller means indicative thereof so the beam controller means will operate in accordance with the scan direction.

15. A symbol read device according to claim 14 wherein the scan direction detector means comprises a plurality of detecting elements positioned so as to be responsive only to predetermined scan lines, such that signals produced by the detecting elements indicate which line is being scanned.

16. A symbol read device according to claim 14 wherein the scan direction detector means comprises:

a magnet fixed to the scanning means; and a plurality of coils positioned such that electrical signals are induced individual coils based on the position of the magnet, the signals from the coils providing an indication of which line is being scanned.

17. A symbol read device comprising:

a laser beam source for emitting a laser beam;

means for pulse driving the laser beam;

means for scanning the laser beam across a symbol surface having a symbol thereon to be read capable of scanning in either a multidirection or a unidirection;

detector means for receiving light reflected from the symbol surface and generating a detector signal indicative thereof;

automatic gain control (AGC) circuit means for amplifying, with variable gain, the detector signal;

recognizing means, coupled so as to receive an output of the AGC circuit means, and signal processing the signal therefrom so as to recognize the symbol being read;

scan direction detector means for detecting which of a plurality of scan directions the laser beam is being scanned and providing a signal indicative thereof;

beam controller means for controlling the pulse driving means, at lease partially in response to the signal from the scan direction detector means;

first selector means for selecting whether the symbol read device will operate in a multi-direction scan mode or in a unidirectional scan mode and providing a signal to the beam controller means indicative thereof so the beam controller means will operate in accordance with the scan mode; and second selector means for controlling scan directions when the symbol read device is being operated in the multi-direction scan mode and providing a signal to the beam controller means indicative thereof so the beam controller means will operate in accordance with the scan direction.

18. A symbol read device according to claim 17 wherein the scan direction detector means comprises a plurality of detecting elements positioned so as to be responsive only to predetermined scan lines, such that signals produced by the detecting elements indicate which line is being scanned.

19. A symbol read device according to claim 17 wherein the scan direction detector means comprises:

a magnet fixed to the scanning means; and a plurality of coils positioned such that electrical signals are induced in individual coils based on the position of the magnet, the signals from the coils providing an indication of which line is being scanned.

20. A symbol read device according to claim 17 wherein the AGC circuit means comprises:

a variable gain amplifier (VGA) having an input coupled to receive the detector signal;

an integrator coupled to an output of the VGA for integrating its output; and a sample and hold circuit coupled to an output of the integrator for sampling and holding an output value thereof, the sample and hold circuit feeding back a value to the VGA for controlling its gain.

21. A symbol read device according to claim 17 wherein the AGC circuit means comprises:

a variable gain amplifier (VGA) having an input coupled to receive the detector signal;

an integrator coupled to an output of the VGA for integrating its output; and a plurality of sample and hold circuits selectively coupled to an output of the integrator, each sample and hold circuit corresponding to a particular scan line, the sample and hold circuits sampling and holding an output value of the integrator and selectively feeding back a value to the VGA for controlling its gain.

* * * * *